(12) United States Patent
Gosselin

(10) Patent No.: US 7,077,988 B2
(45) Date of Patent: Jul. 18, 2006

(54) CORRUGATED FIBERBOARD PANELS FOR USE IN THE CONSTRUCTION OF WALLS, CEILINGS AND FLOORS

(75) Inventor: Georges Gosselin, Otterburn Park (CA)

(73) Assignee: Jacques-Cartier Travaux de Fer Ltée-Iron Work Ltd., Otterburn Park (CA)

( * ) Notice: Subject to any disclaimer, the term of this patent is extended or adjusted under 35 U.S.C. 154(b) by 83 days.

(21) Appl. No.: 10/949,316

(22) Filed: Sep. 27, 2004

(65) Prior Publication Data
US 2005/0034382 A1 Feb. 17, 2005

Related U.S. Application Data

(62) Division of application No. 10/227,406, filed on Aug. 26, 2002, now abandoned.

(51) Int. Cl.
*B27N 5/00* (2006.01)
(52) U.S. Cl. .................. 264/120; 264/118; 264/119
(58) Field of Classification Search .............. 264/118, 264/119, 120
See application file for complete search history.

(56) References Cited

U.S. PATENT DOCUMENTS

| | | | |
|---|---|---|---|
| 3,003,204 A | 10/1961 | Bryant | |
| 3,216,059 A * | 11/1965 | Voelskow | 425/147 |
| 3,991,535 A | 11/1976 | Keller et al. | 52/642 |
| 4,061,813 A | 12/1977 | Geimer et al. | 264/119 |
| 4,429,012 A | 1/1984 | Danko | 428/12 |
| 4,616,991 A | 10/1986 | Bach et al. | 269/148 |
| 5,090,173 A | 2/1992 | Coggan et al. | 52/309.8 |
| 5,290,621 A | 3/1994 | Bach et al. | 428/176 |
| 5,299,405 A | 4/1994 | Thompson | 52/975 |
| 5,685,124 A | 11/1997 | Jandl, Jr. | 52/783.11 |
| 6,364,982 B1 | 4/2002 | Lynch et al. | 264/109 |
| 6,511,567 B1 | 1/2003 | Ruggie et al. | 264/109 |

* cited by examiner

*Primary Examiner*—Mary Lynn Theisen
(74) *Attorney, Agent, or Firm*—Ogilvy Renault LLP

(57) ABSTRACT

A corrugated wooden fiberboard panel system provides a new structural member for use in the construction of building walls, ceilings, and floors as a substitute for conventional framing members, such as studs and joists.

5 Claims, 8 Drawing Sheets

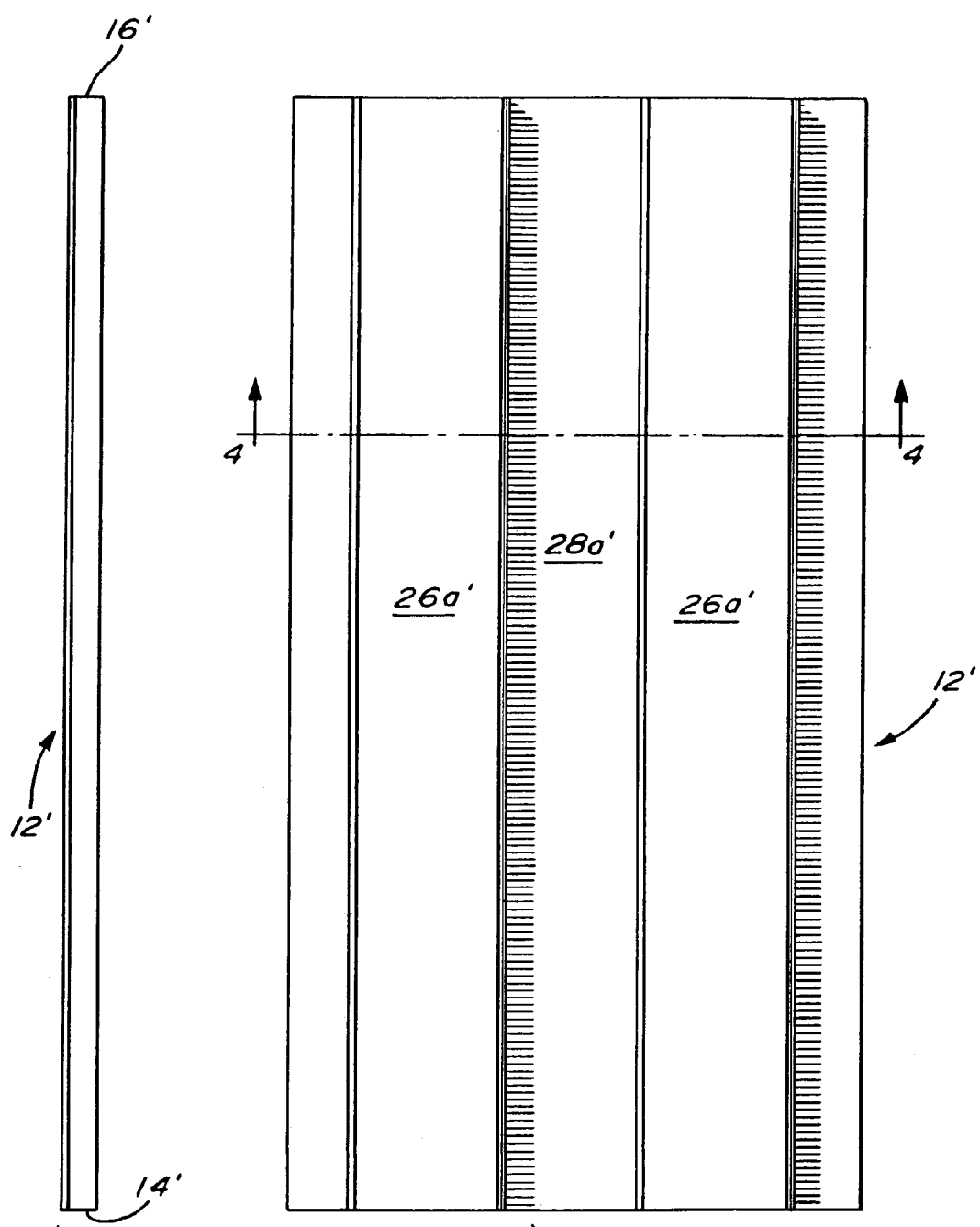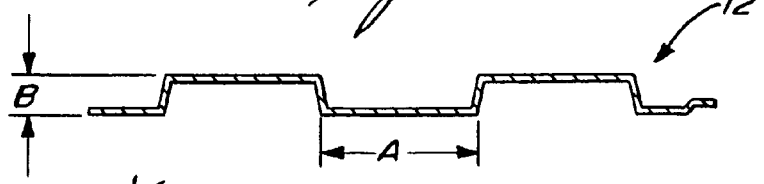

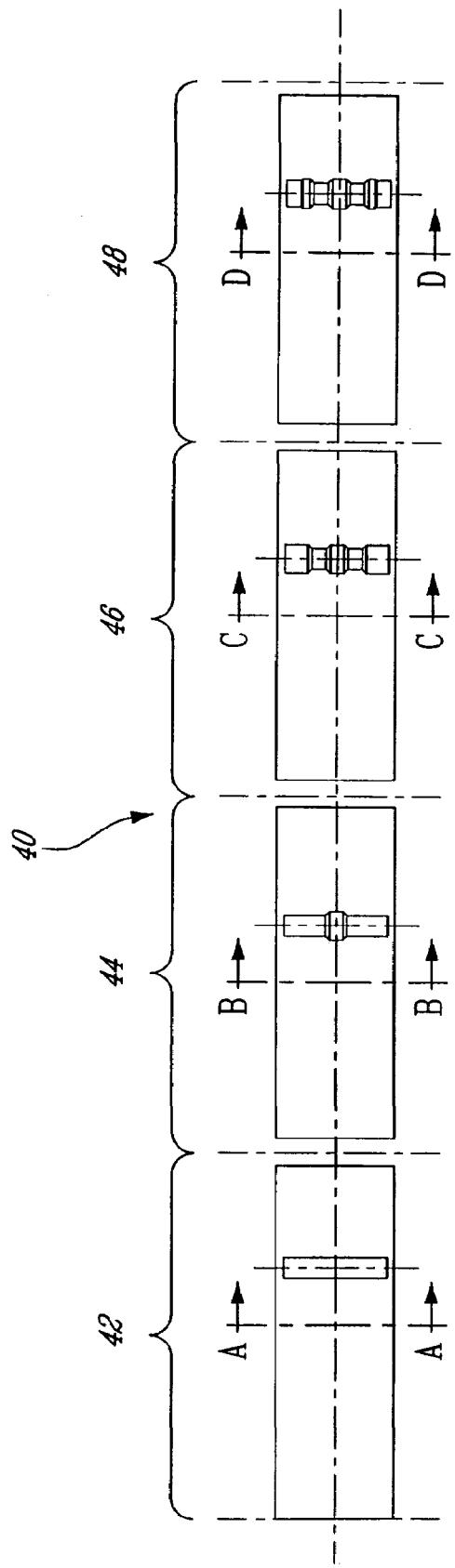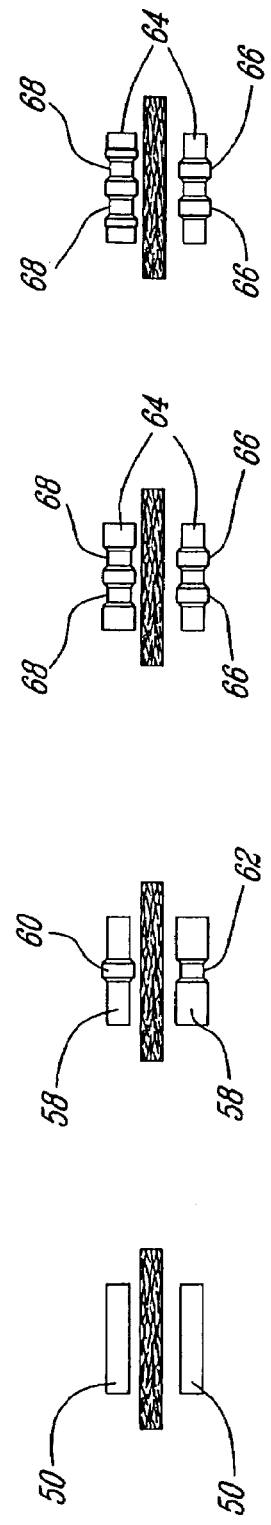

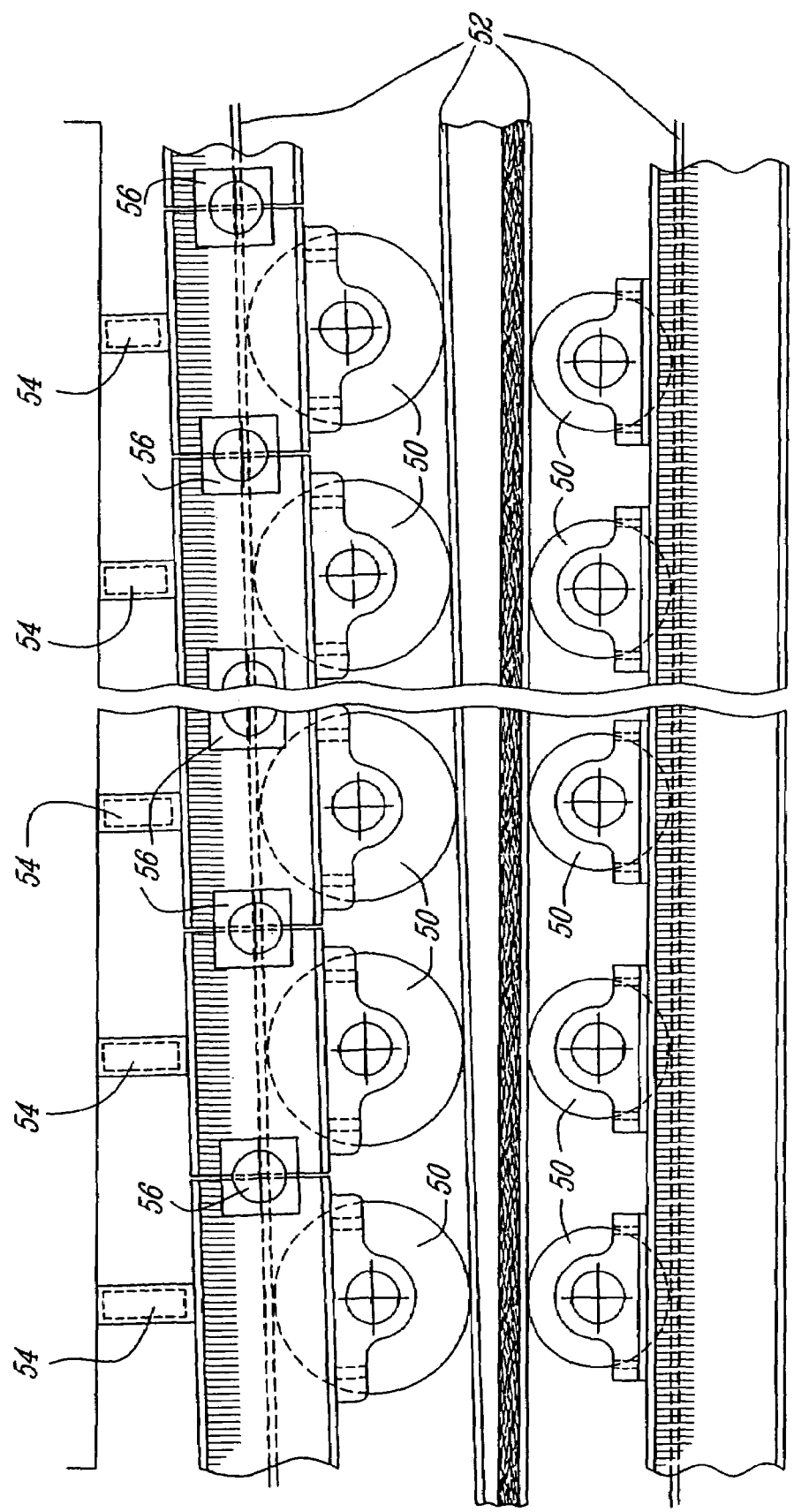

CORRUGATED FIBERBOARD PANELS FOR USE IN THE CONSTRUCTION OF WALLS, CEILINGS AND FLOORS

CROSS-REFERENCE TO RELATED APPLICATION

This application is a divisional of application Ser. No. 10/227,406, filed Aug. 26, 2002 now abandoned.

BACKGROUND OF THE INVENTION

1. Field of the Invention

The present invention is directed to the field of building construction and is particularly concerned with a structural fiberboard panel for use in the construction of walls, ceilings and floors.

2. Description of the Prior Art

Wood frame construction is currently the most commonly used system for residential construction.

According to this system, the skeleton structure or framing of a building wall typically comprises a series of upstanding wood studs nailed at regular intervals along a floor runner (usually a 2×4 lumber) secured to the floor where a wall is to be erected.

One drawback of the above-described use of wood studs as wall-framing members is the time consuming step of establishing the stud locations along the floor runner. Also, the utilization of such studs generally requires on-site fabrication and a significant degree of skill. Furthermore, the increasing price of wood and the growing concern over the quality and quantity of world's dwindling wood supply constitute further evidence of the need of an alternative to conventional wood framing members.

Likewise, ceiling and roof framings have traditionally been erected with wooden studs individually cut to size and secured together to form joist assemblies and, thus, poses the same problems as those of conventional wall framing.

Therefore, there is a need for a new framing system for walls, ceiling and floors.

SUMMARY OF THE INVENTION

It is therefore an aim of the present invention to provide an alternative to conventional framing members used in building construction.

It is a further aim of the present invention to provide a new corrugated fiberboard panel as a substitute to conventional framing studs used in building construction.

It is a further aim of the present invention to provide a new framing member that is economical to produce.

It is a further aim of the present invention to provide a new framing member that offers ease of installation.

Therefore, in accordance with the present invention, there is provided a framing member for carrying wallboard, flooring board or ceiling board. The framing member comprises a corrugated fiberboard panel defining alternate longitudinally extending ridges and grooves, each ridge having a planar surface to which a selected one of the wall board, the flooring board and the ceiling board can be mounted.

In accordance with a further general aspect of the present invention, there is provided a building wall having a framing structure comprising at least one upstanding corrugated fiberboard panel defining alternate upstanding ridges and grooves, each ridge offering a mounting surface for a wallboard.

In accordance with a still further general aspect of the present invention there is provided a building framing structure for use in the construction of a building wall, ceiling or floor as a substitute to conventional framing members. The building framing structure comprises a structural member in the form of a rigid corrugated fiberboard panel defining alternate ridges and grooves.

In accordance with a still further general aspect of the present invention there is provided a prefabricated skeleton member for use in the construction of a building wall, ceiling or floor. The skeleton member comprises a fiberboard panel, the fiberboard panel having a longitudinal axis and defining a plurality of corrugations extending in parallel to the longitudinal axis.

In accordance with a further general aspect of the present invention, there is provided a method for manufacturing a corrugated waferboard, comprising the steps of: providing a mat of wood wafers mixed with a resin binder, forming at least one preliminary corrugation in said mat by passing said mat between at least a first pair of heated nip rolls having complementary male and female forming portions, and by imparting to said preliminary corrugation a final form by passing said preliminary corrugation between complementary male and female forming portions of at least a second pair of nip rolls.

In accordance with a further general aspect of the present invention, there is provided a method for manufacturing a corrugated waferboard, comprising the steps of providing a number of flat waferboard panels, assembling said flat waferboard panels in a corrugated configuration by bonding and fastening the panels along lateral edges thereof.

BRIEF DESCRIPTION OF THE DRAWINGS

Having thus generally described the nature of the present invention, reference will now be made to the accompanying drawings, showing by way of illustration a preferred embodiment thereof and in which:

FIG. 3 is a front elevation view of a second corrugated fiberboard panel;

FIG. 4 is a cross-sectional view taken along line 4—4 in FIG. 3;

FIG. 5 is a side elevation view of the corrugated fiberboard panel of FIG. 3;

FIG. 6 is schematic top plan view of a corrugated waferboard production plant;

FIG. 7 is a schematic side view of a pressing section of the production plant shown in FIG. 6;

DESCRIPTION OF THE PREFERRED EMBODIMENTS

Figure 1:
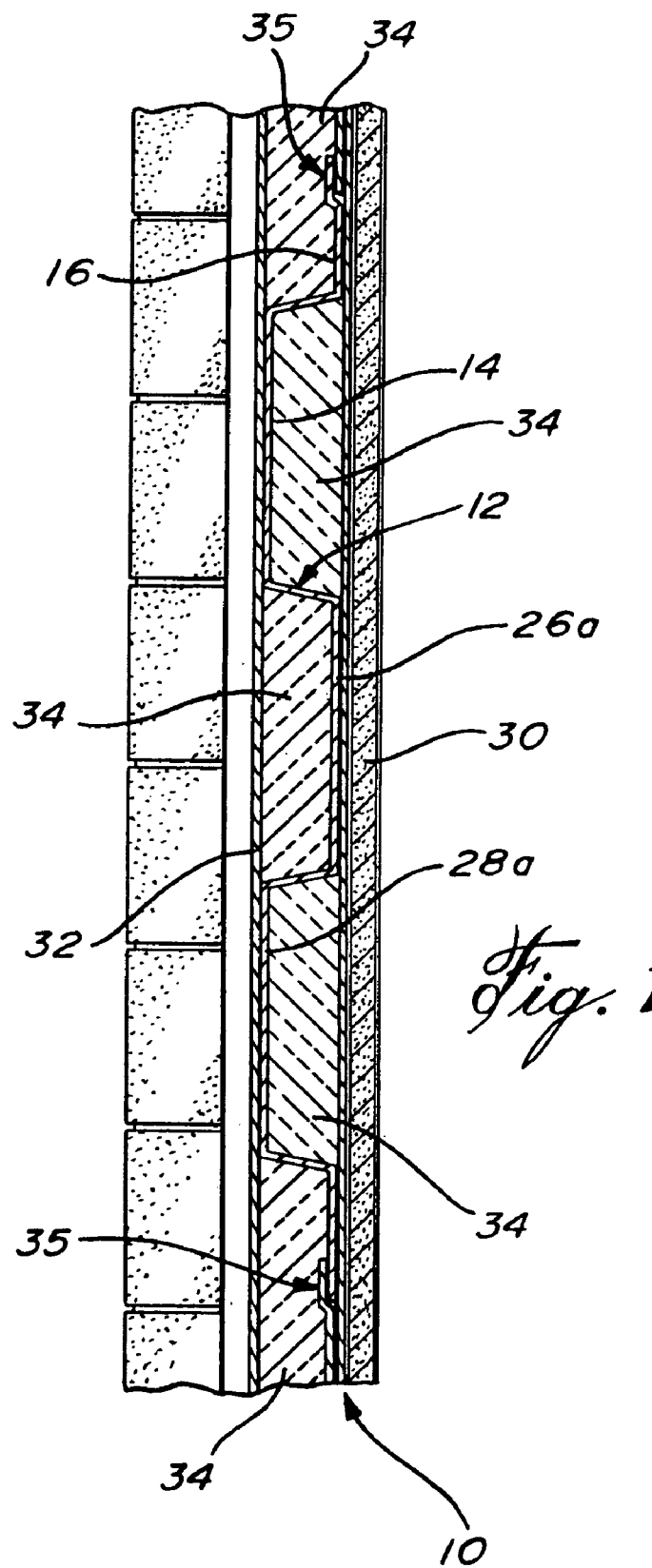
FIG. 1 is a top plan cross-sectional view of a building wall having a skeleton including a number of side by side corrugated fiberboard panels in accordance with a first embodiment of the present invention.

Now referring to the drawings and more particularly to FIGS. 1 and 2, a new structural member embodying the elements of the present invention and generally designated by reference numeral 10 will be described.

More specifically the structural member 10 is adapted to be used in the construction of interior and exterior walls, ceilings and floors, in place of conventional framing members, such as studs and joists.

Figure 2:
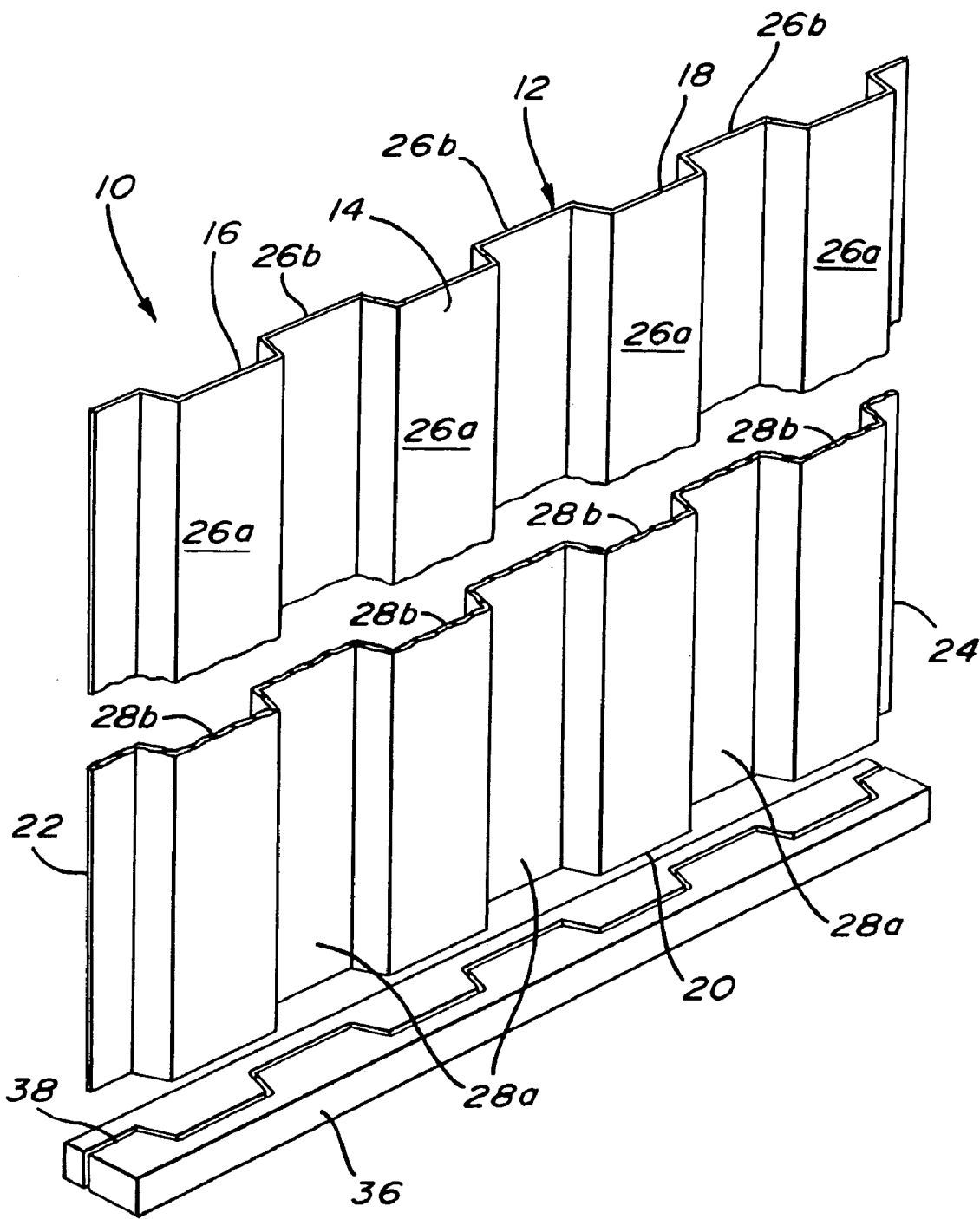
FIG. 2 is a perspective view of one corrugated fiberboard panel and associated base member.

As seen in FIG. 2, the structural member 10 is provided in the form a rectangular rigid fiberboard panel 12 having first and second opposed surfaces 14 and 16 extending between top and bottom edges 18 and 20 and opposed side edges 22 and 24. The fiberboard panel 12 is preferably composed of wood fibers mixed with a bonding agent, such as glue, and compressed together into a panel or sheet. According to a preferred embodiment of the present invention, the panel is made of relatively large wood chips such as those used in the fabrication of waferboard or chipboard panels. The term fiberboard is herein intended to encompass the term waferboard. It is also contemplated to add glass fibers into the panel 12 in order to improve its structural behavior. The wooden fiberboard panel 12 is of corrugated construction and, thus, the first surface 14 defines alternate ridges 26*a* and grooves 28*a*. Corresponding to the ridges 26*a* and the grooves 28*a* on the first surface 14, the second surface 16 of the panel 12 respectively defines grooves 28*b* and ridges 26*b*. The ridges 26*a* and 26*b* and the grooves 28*a* and 28*b* extend longitudinally of the panel 12 between the top and bottom edges 18 and 20 thereof.

The corrugated fiberboard panel 12 is of uniform thickness and the corrugations (i.e. the ridges and the grooves) thereof are generally trapezoidal in shape. It is also contemplated to form rectangular corrugations in the panel 12 instead of the illustrated trapezoidal ones. The panel 12 could even be undulated depending on the intended use.

As seen in FIG. 1, corrugated fiberboard panels 12, such as the one depicted in FIG. 2, can be used in a wall construction in place of conventional wooden studs. The ridges 26*a* and 26*b* act as conventional upstanding studs to provide a mounting surface for wall sheathing material, such as wallboard 30 and water barrier 32. The grooves 28*a* and 28*b* provide free spaces for receiving insulation material 34 or electrical devices (not shown). The panels 12 are preferably prefabricated with the insulation material adhesively secured in the grooves. One side edge of each panel is preferably recessed (see reference numeral 35 in FIG. 1) for allowing adjacent panels 12 to be attached together along adjoining side edges with the panels 12 extending in a common plane, i.e. the plane of the wall. By so recessing one side edge of each panel, the adjoining edges of a pair of panels can overlap, thereby allowing the same to be secured together by means of standard fasteners, such as nails or screws.

On-site, the top and bottom edges 18 and 20 of each panel 12 are respectively inserted into prefabricated floor and ceiling runners, such as the one designated by reference numeral 36 in FIG. 2. The runners are secured to the floor and the ceiling at a location where a wall has to be erected. The top and bottom runners 36 each define a groove 38 shaped and configured to mate with a corresponding top edge or bottom edge of an associated corrugated fiberboard panel. The grooved floor and ceiling runners 36 are preferably made of fiberboard.

FIGS. 3 to 5 illustrate another construction of a corrugated fiberboard panel 12' for use as a skeleton member in the construction of a building wall, floor or ceiling. The panel 12' is similar to panel 12 of FIG. 2 but has three corrugations instead of seven. It is understood that the number of corrugations as well as the dimensions of each corrugation may vary depending on the intended application. The thickness of the panel may also vary from about ¼ inch to about 1 inch depending on the structural strength needed. The space between the ridges can be anywhere between 1 inch and 6 inches. The height of the ridges is comprised in a range extending from about 1 inch to about 6 inches. The angle of the sides of the ridges and grooves is comprised in a range of about 45 degrees to 90 degrees. According to one embodiment of the present invention, the panel 12' is 48 inches wide, 8 feet long, the space A between each ridge is 12 inches, and the height B of each ridge is 3⅝ inches. According to another embodiment of the present invention, the panel includes two trapezoidal ridges spaced by a smaller trapezoidal groove and is 16 inches wide, 8 feet long, A=2¼ inches, and B=3 inch. Each ridge offers a mounting surface that is 4⅝ inches wide. The ridge corresponding to the 2¼ groove in the opposed side surface of the panel offers a mounting surface that is 2 inches wide.

The corrugated fiberboard panels 12 and 12' are preferably manufactured by first dispensing in a predetermined proportion wood fibers and a bonding agent onto a fine mesh or woven conveyor surface, such as those used in the paper industry for transporting paper pulp. The fiber is uniformly distributed on the conveyor surface to obtain an appropriate thickness of material before proceeding with the pressing operation. Then, the bonding agent and fiber mixture is transferred to a hydraulic press including upper and lower platen surfaces for apply heat and pressure to the mixture of fiber and bonding agent. The resin-coated fibers are pressed to obtain a flat wood flake mat having an appropriate thickness for the subsequent forming operation.

As shown in FIG. 6, the so formed mat is then passed through a manufacturing line 40 comprising a pressing section 42 followed by three forming sections 44, 46 and 48. The pressing section 42 comprises a plurality of axially spaced-apart pairs of top and bottom smooth cylindrical rollers 50 defining a nip for receiving the mat. The mat is carried between a pair of fine mesh endless conveying members 52 (FIG. 7) extending about the upper and lower series of pressing rollers 50. However, the fine mesh endless member is optional for the top pressing rollers. Hydraulic jacks 54 are provided for adjusting the nip between the top and bottom rollers 50. Flexible joints 56 are provided to permit variable opening of forming material. Each pressing roller 50 has a uniform cylindrical outer surface and is heated.

Figure 8A:
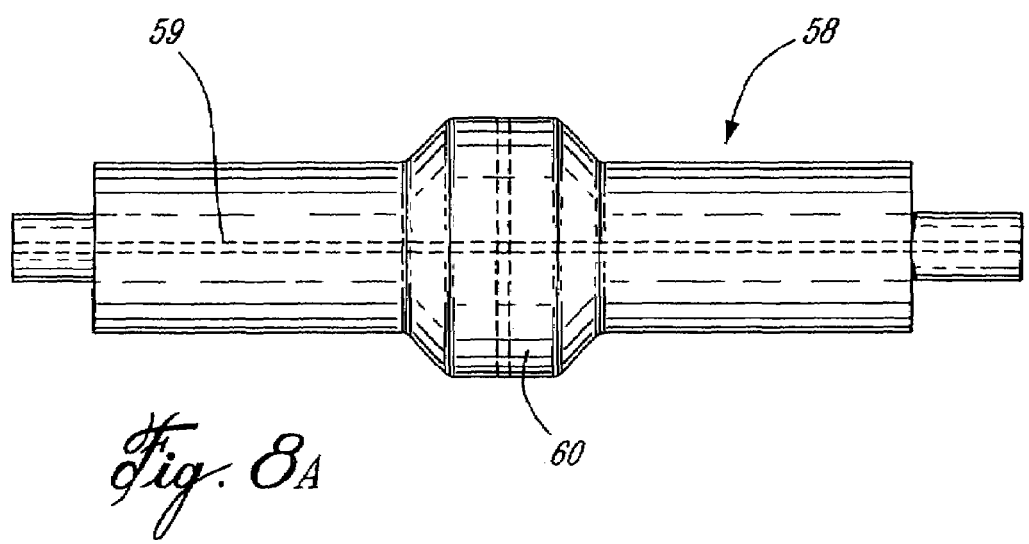
FIGS. 8a and 8b are side views of the top and bottom nip rolls of a first forming section of the production plant.
Figure 8B:
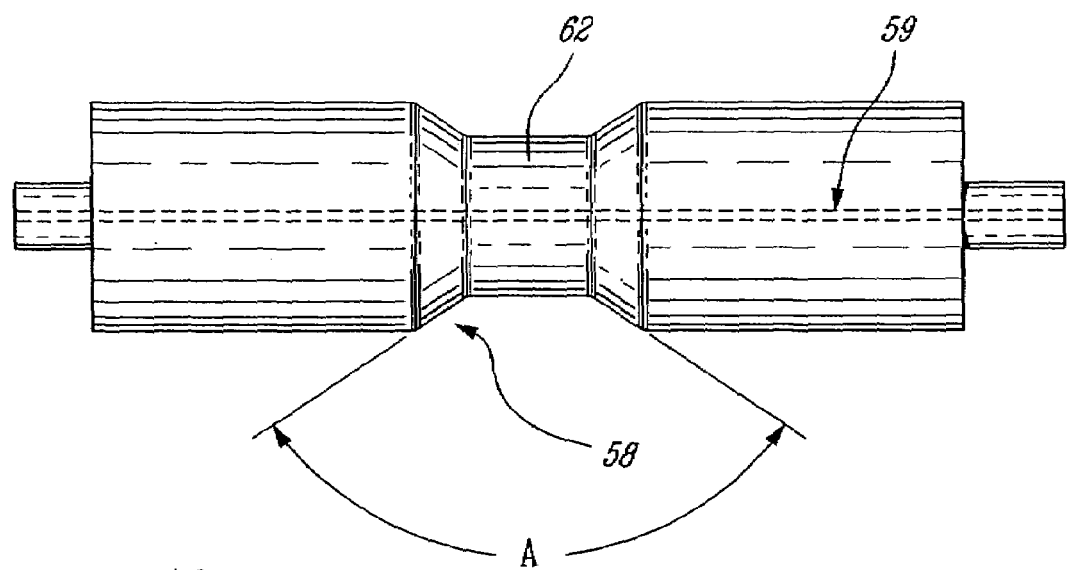

From the pressing section 42, the mat is passed through the first forming section 44. The first forming section 44 comprises a number of axially spaced-apart pairs of top and bottom nip rolls 58 having complimentary central male and female trapezoidal forming portions 60 and 62. Endless fine mesh conveying members (not shown) extends about the top and bottom nip rolls 58. The nip rolls 58 are heated and configured to create a central corrugation in the mat as the same is advanced through the first forming section 44. Each roll 58 defines a central axial passage 59 (FIGS. 8*a* and 8*b*) through which steam can be circulated to heat the roll 58. Like for the rollers 50, the nip defined between the rolls 60 is adjustable. The nip rolls 58 located at the upstream end of the first forming section 44 are machined with a wider opening angle A (see FIG. 8*b*) of the trapezoidal forming portion than the one of the rolls 58 located at the downstream end of the section 44 to permit the gliding of the fine mesh. The trapezoidal opening angle A of the nip rolls 58 gradually decreases towards the downstream end of the first forming section 44 to a final value corresponding to the final form of the corrugation to be imparted to the mat. In this way, a central preliminary corrugation is progressively defined in the mat and gradually shaped to its final desired form as the mat is advanced through the first forming section 44.

Figure 9A:
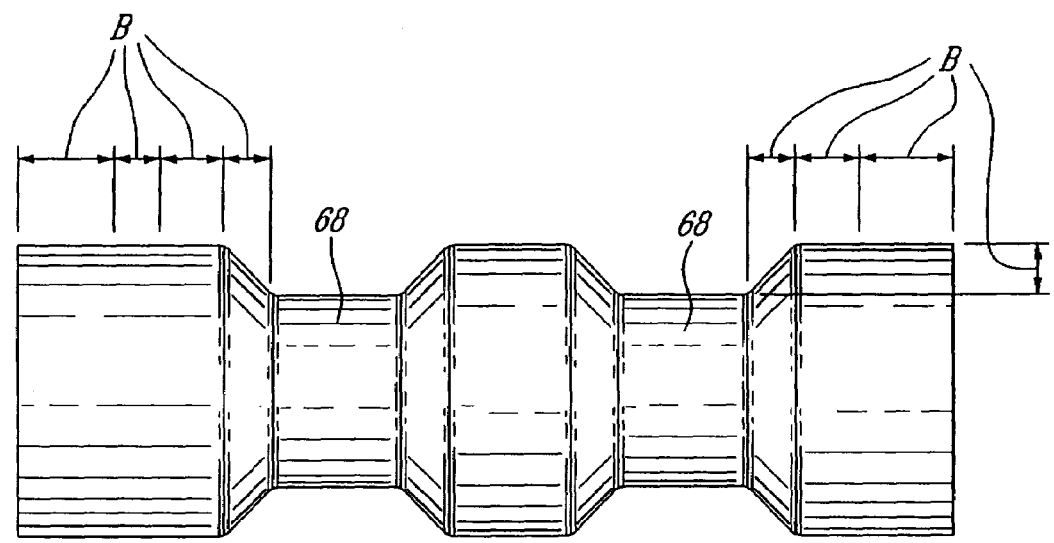
FIGS. 9a and 9b are side views of the top and bottom nip rolls of a second forming section of the production plant.
Figure 9B:
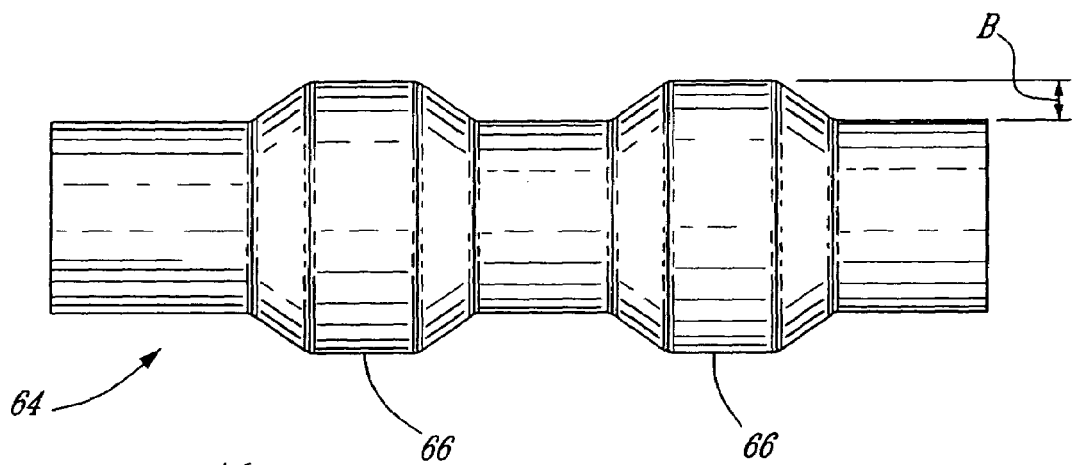
Figure 10A:
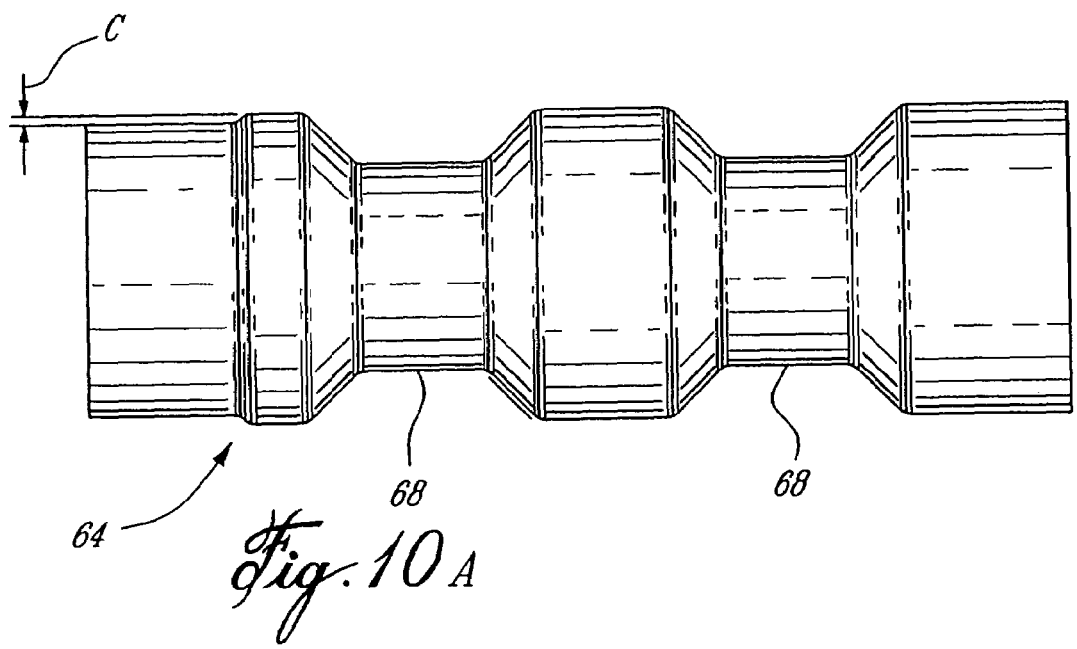
FIGS. 10a and 10b are side views of the top and bottom nip rolls of a third forming section of the production plant.
Figure 10B:
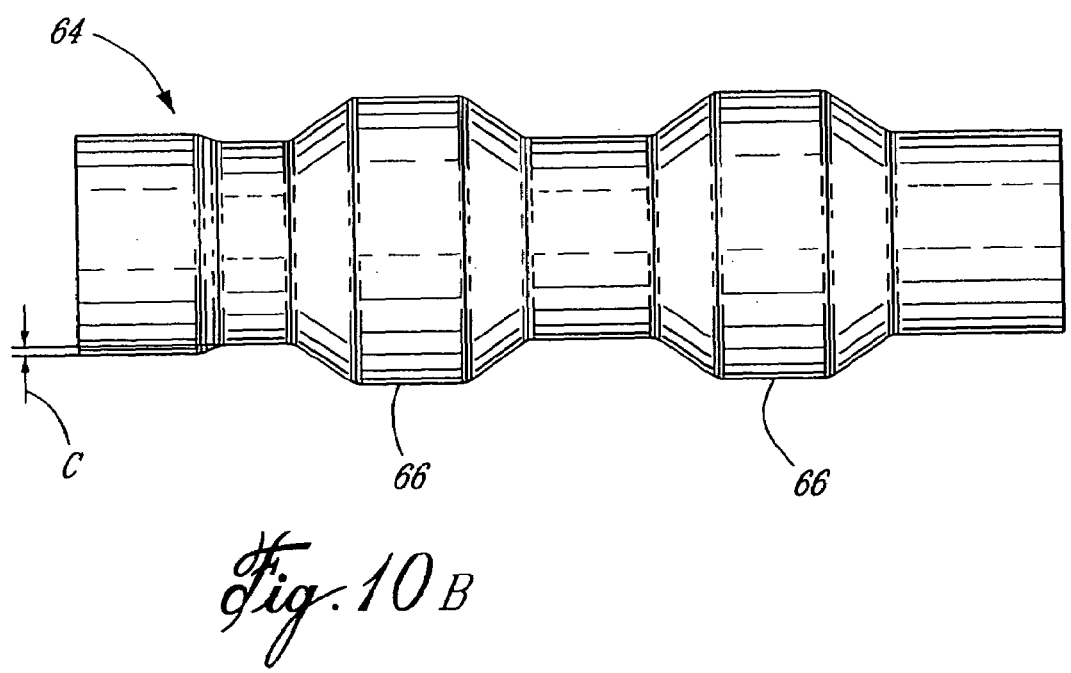

The second and third forming sections 46 and 48 are equipped with a plurality of axially spaced-apart pairs of top and bottom nip rolls 64 which are each provided with first and second complimentary male and female trapezoidal forming portions 66 and 68 for creating a pair of corrugations in the mat on opposed lateral sides of the central corrugation created therein at the first forming section 44. Apart from the above, the second and third forming sections 46 and 48 are similar to the first forming section 44. As for the rolls of the first forming section 44, the rolls 64 located at the upstream end of the second forming sections 46 are machined with wider angles to permit gliding of the endless wire mesh members. More particularly, the dimensions B (FIGS. 9*a* and 9*b*) are gradually increased to the final dimensions at the downstream end of the second forming station 46. Likewise, the dimensions C (FIGS. 10*a* and 10*b*) of the rolls 64 of the third forming station 48 gradually increase to a final desired value at the downstream end of the third section 48. Accordingly, two additional corrugations are progressively defined in the mat on opposed sides of the central corrugation as the mat is advanced through the second and third forming sections 46 and 48.

After a drying period, the so formed corrugated web is cut down into panels of desired length.

Alternatively, the corrugated fiberboard panel 12 can be manually manufactured by assembling a plurality of flat fiberboard panels assembled together with adjacent panels extending at an angle relative to one another so as to form a series of corrugations. The panels would be cut down to the desired dimensions and then placed on a work table having a corrugated support surface formed of angularly oriented linear segments and generally corresponding to the desired corrugation profile. Glue is applied to the sides of the panels and the panels are assembled to one another on the corrugated support surface of the worktable. A vacuum is preferably applied to hold the panels on the corrugated support surface of the worktable. Then, nails, screw, staples or other types of fasteners are used to rigidly secure the side-by-side pre-assembled panels, there by allowing to displace the assembled corrugated panel without having to wait for the glue to dry. After the fasteners have been installed, the vacuum is removed and the assembled corrugated panel is directed to a storage area where it will dry before being shipped. It is noted that bands of rigid insulation materials can be provided and fixed in the corrugations of the assembled panels. The insulation material will give additional strength to the so assembled corrugated panel.

The above described wooden corrugated fiberboard panel is advantageous over conventional framing members in that it is easier to install and cheaper to produce.

The invention claimed is:

1. A method for manufacturing a corrugated waferboard, comprising the steps of: providing a mat of wood wafers mixed with a resin binder, forming at least one preliminary corrugation in said mat by passing said mat between at least a first pair of heated nip rolls having complementary male and female forming portions, and by imparting to said preliminary corrugation a final form by passing said preliminary corrugation between complementary male and female forming portions of at least a second pair of nip rolls, further comprising at least roughly forming a central corrugation in said mat before starting to form a pair of corrugations on opposed sides of said central corrugation.

2. A method as defined in claim 1, further comprising the step of: gradually reducing the dimensions of the preliminary corrugation to final desired dimensions.

3. A method as defined in claim 1, further comprising the steps of passing said mat between at least one pair of heated pressing rolls before forming said preliminary corrugation.

4. A method for manufacturing a corrugated waferboard, comprising the steps of: providing a mat of wood wafers mixed with a resin binder, forming at least one preliminary corrugation in said mat by passing said mat between at least a first pair of heated nip rolls having complementary male and female forming portions, and by imparting to said preliminary corrugation a final form by passing said preliminary corrugation between complementary male and female forming portions of at least a second pair of nip rolls, wherein the dimensions of the preliminary corrugation are gradually reduced to final desired dimensions.

5. A method for manufacturing a corrugated waferboard, comprising the steps of: providing a mat of wood wafers mixed with a resin binder, forming at least one preliminary corrugation in said mat by passing said mat between at least a first pair of heated nip rolls having complementary male and female forming portions, and by imparting to said preliminary corrugation a final form by passing said preliminary corrugation between complementary male and female forming portions of at least a second pair of nip rolls, further comprising the step of passing said mat between at least one pair of heated pressing rolls before forming said preliminary corrugation.

* * * * *